Figure 3:
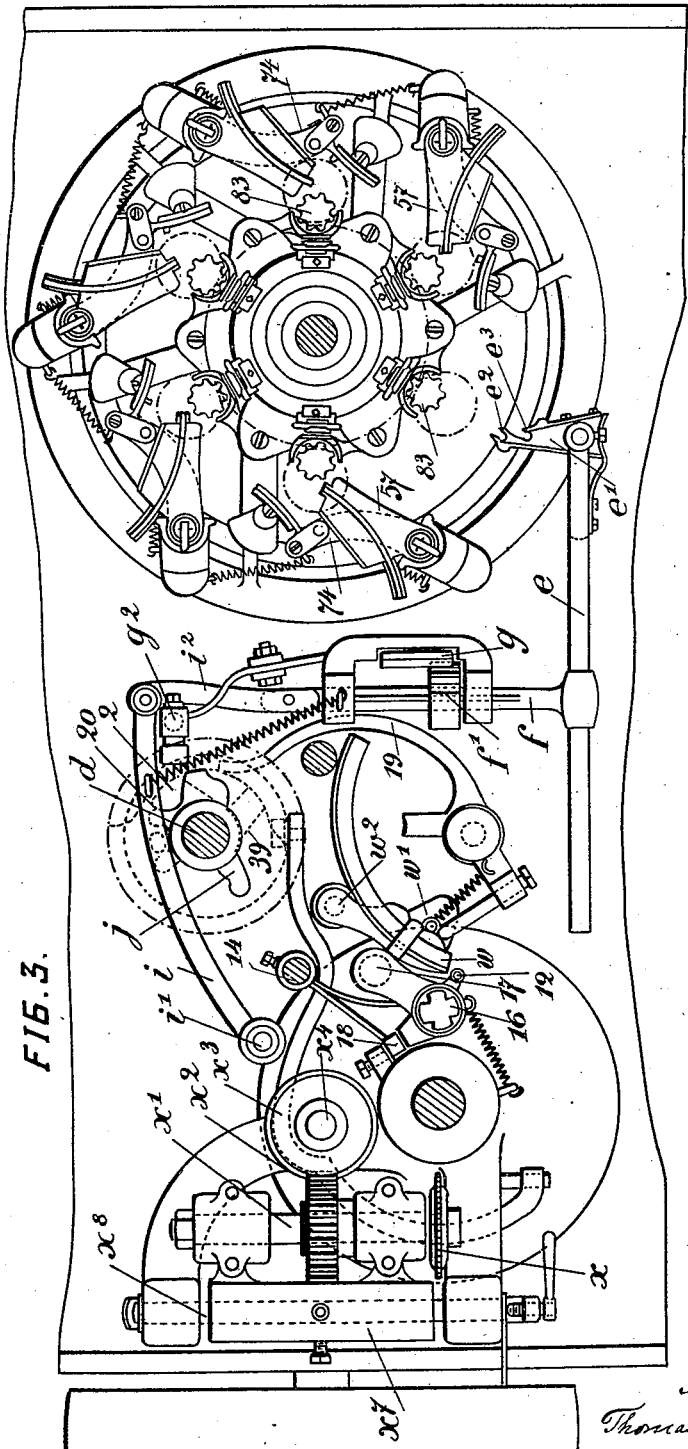

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 1.
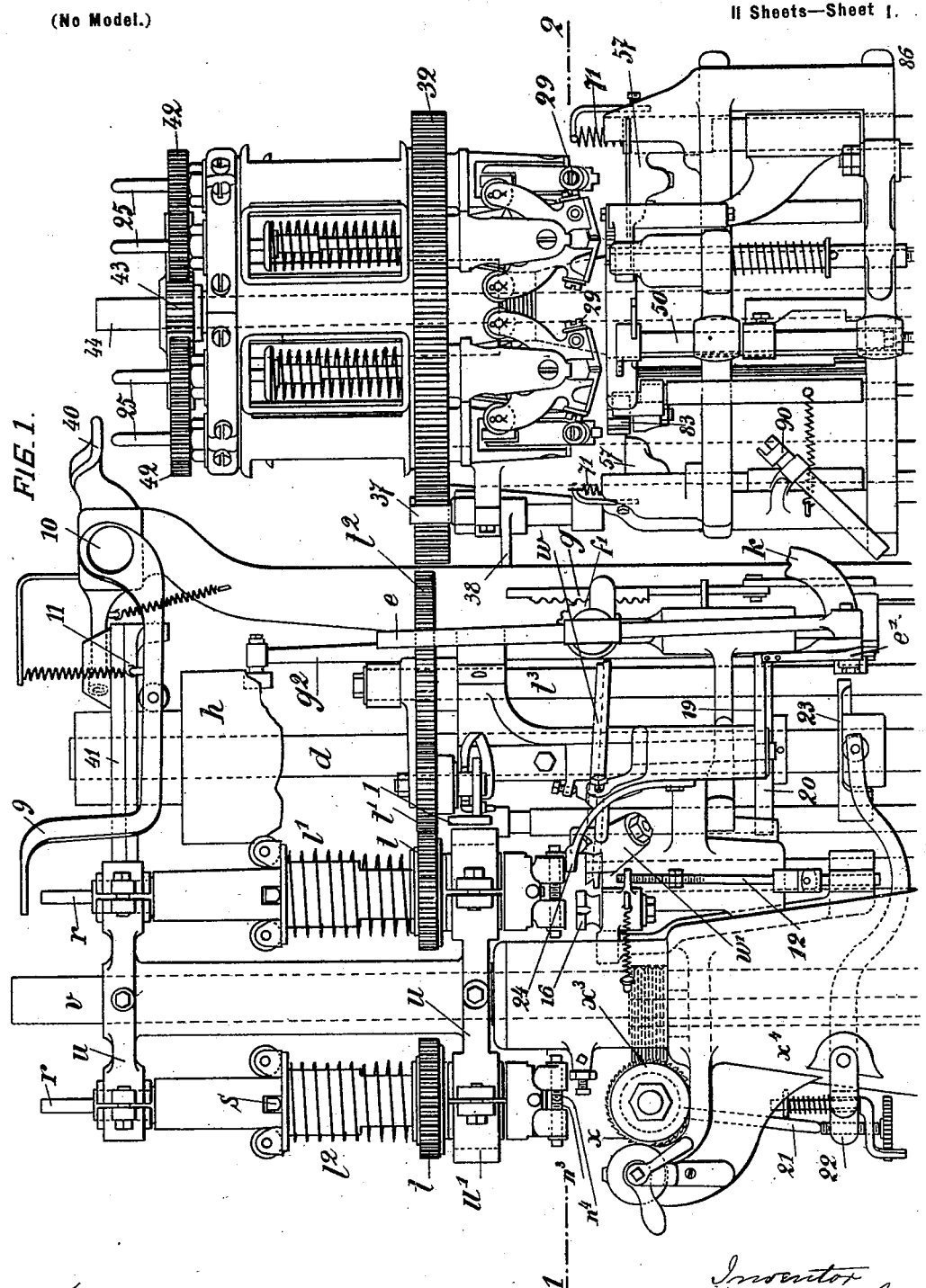

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 2.
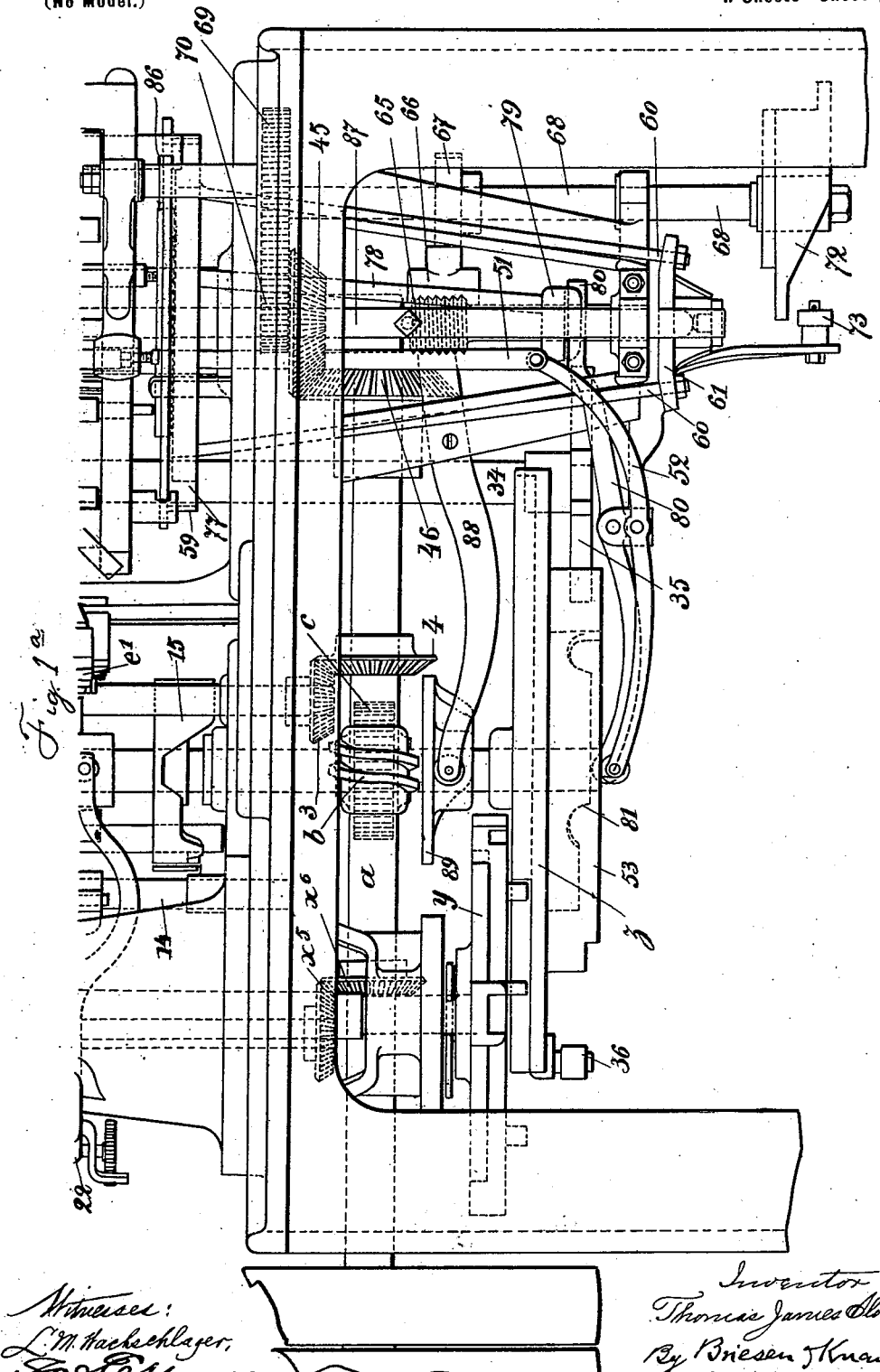

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 3.
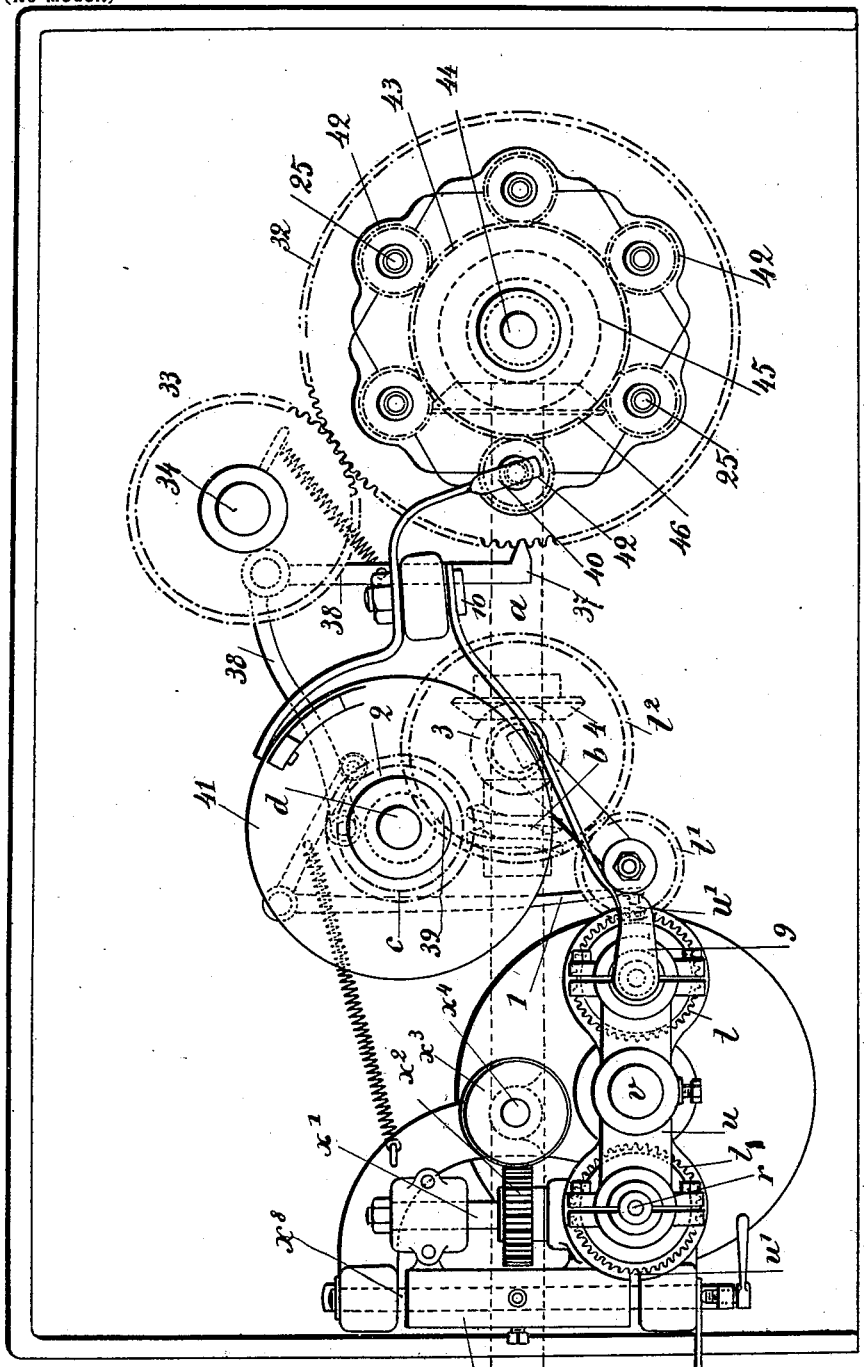
FIG. 2.
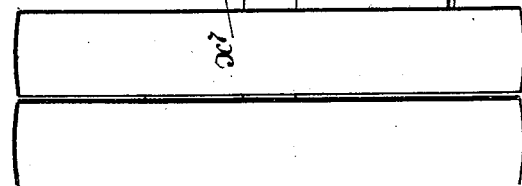

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 4.

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 5.

WITNESSES:
INVENTOR
Thomas James Sloan
BY
ATTORNEYS

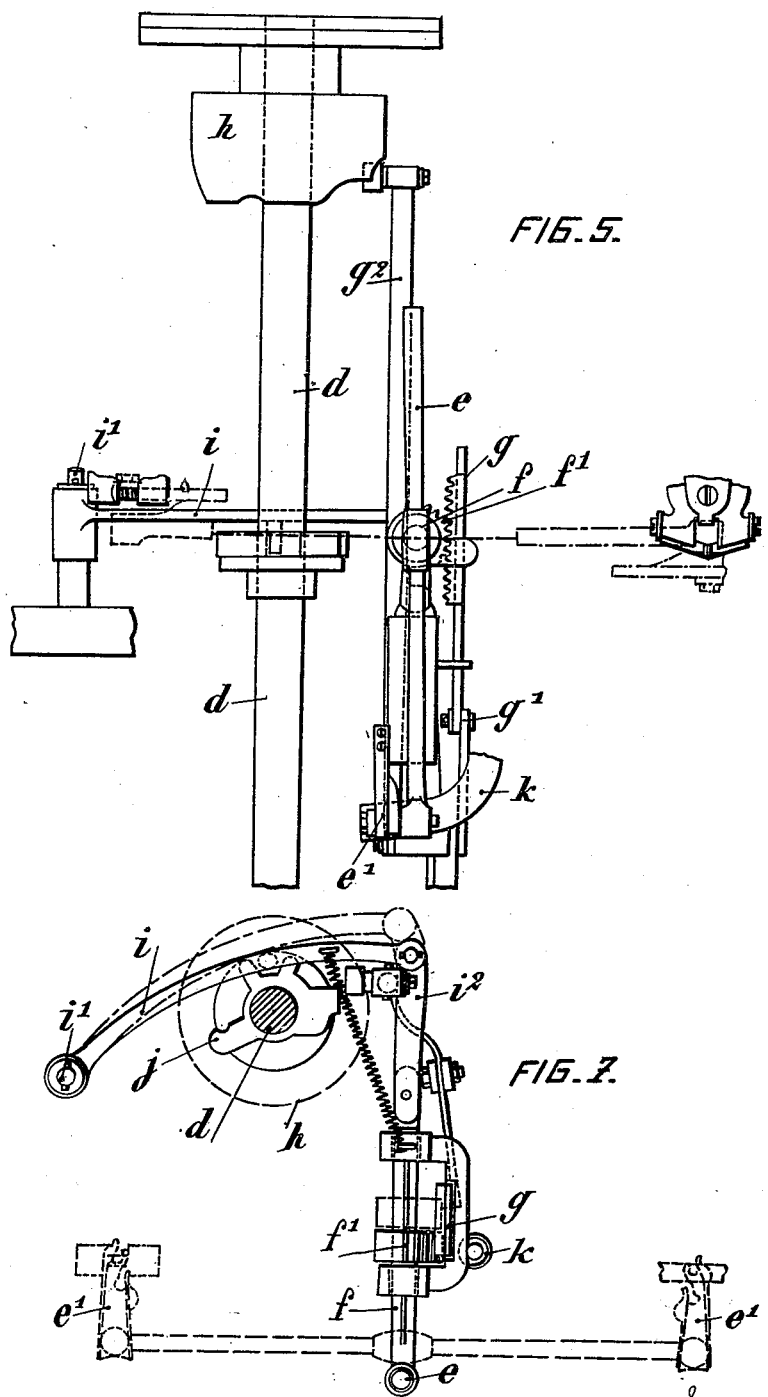

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 7.
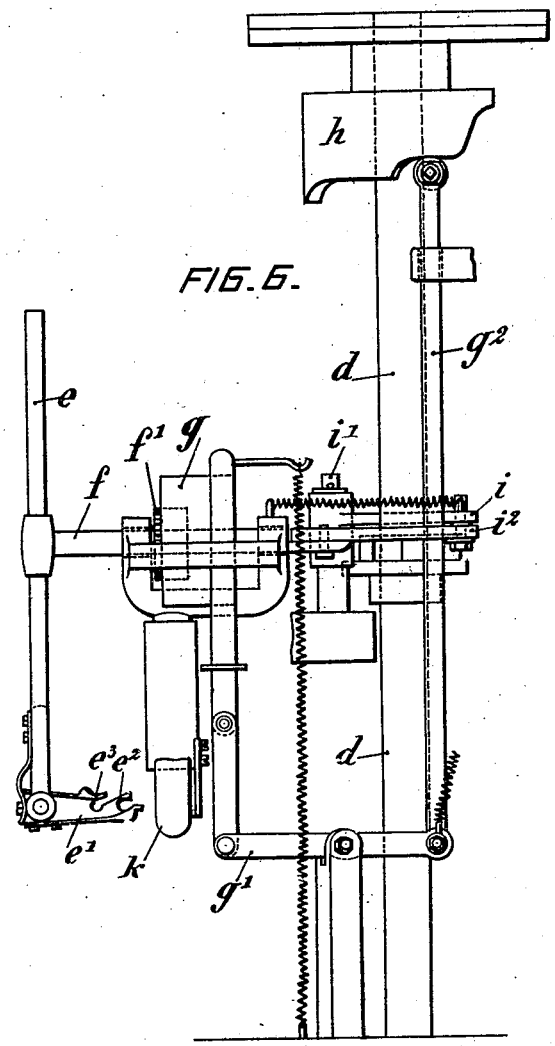

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 8.
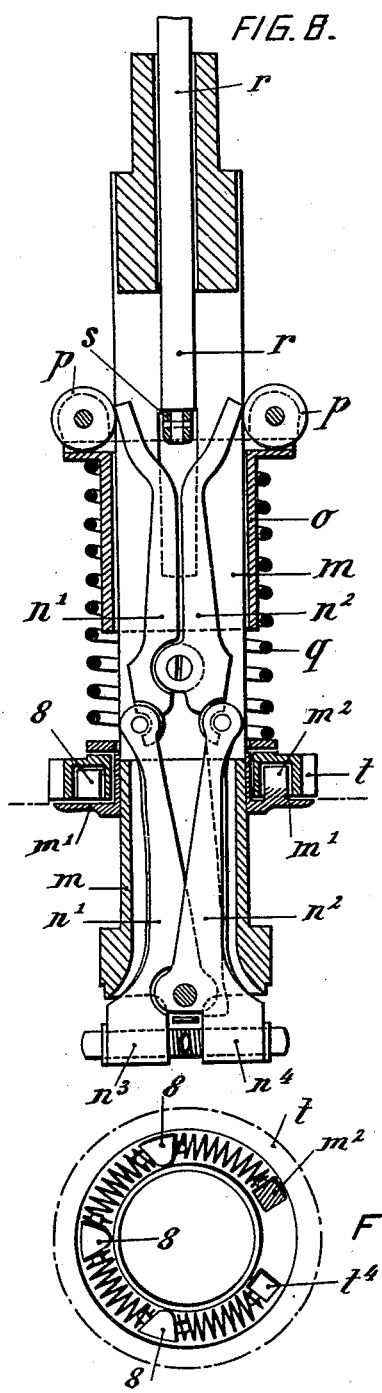
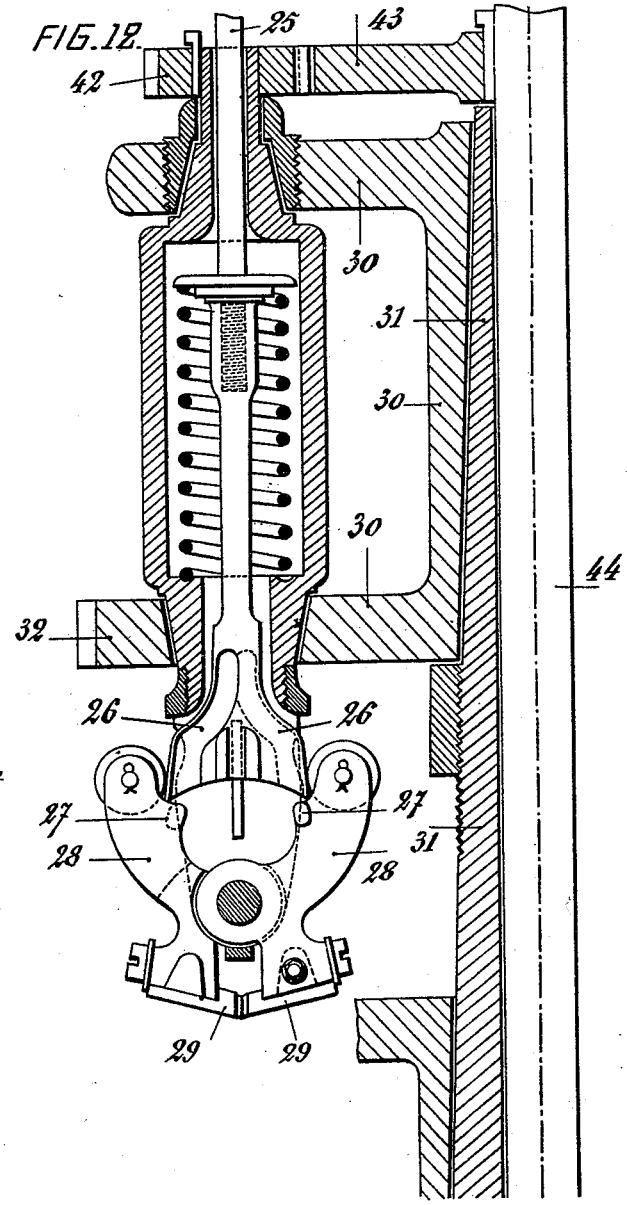

No. 645,139. Patented Mar. 13, 1900.
T. J. SLOAN.
MACHINE FOR MANUFACTURING WOOD SCREWS.
(Application filed Apr. 23, 1897.)
(No Model.) 11 Sheets—Sheet 9.
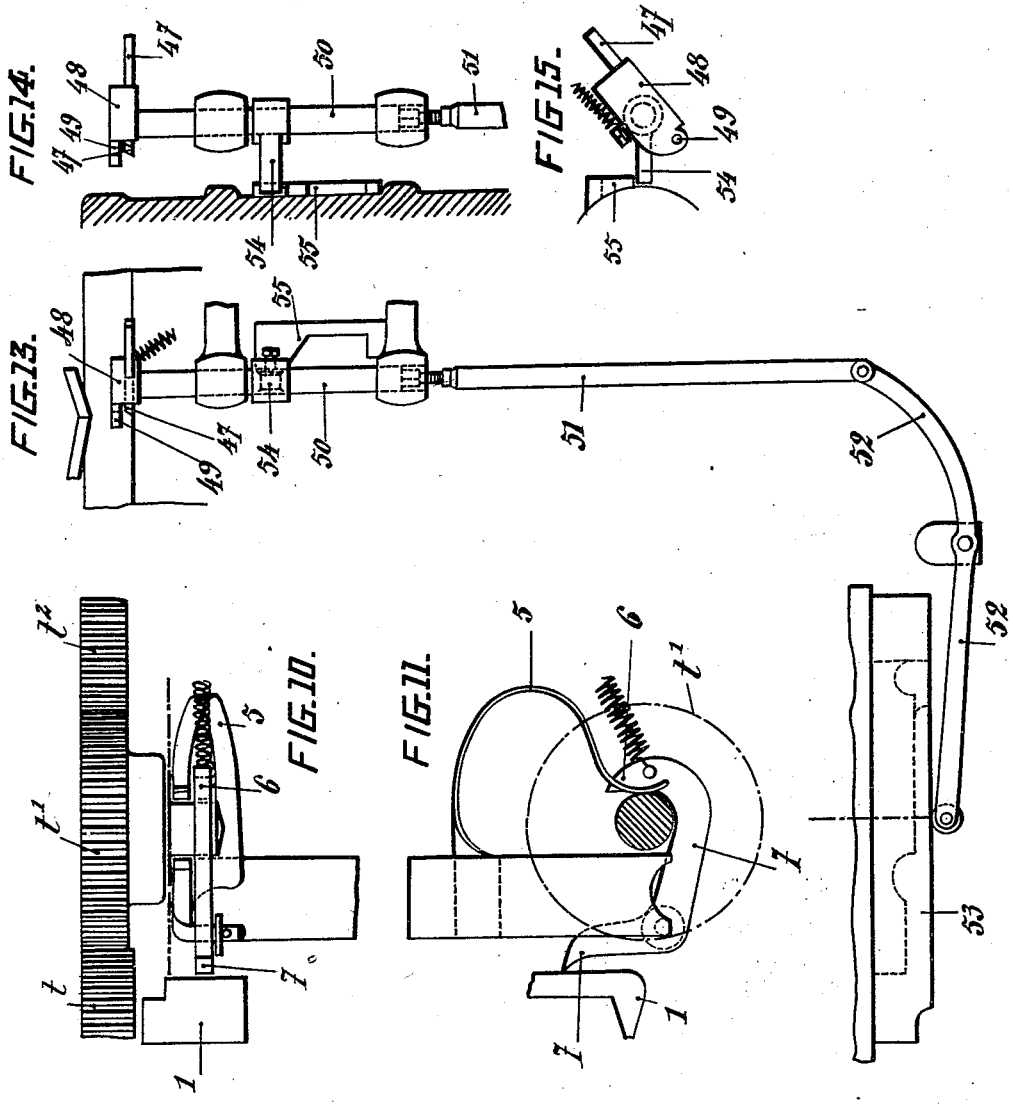

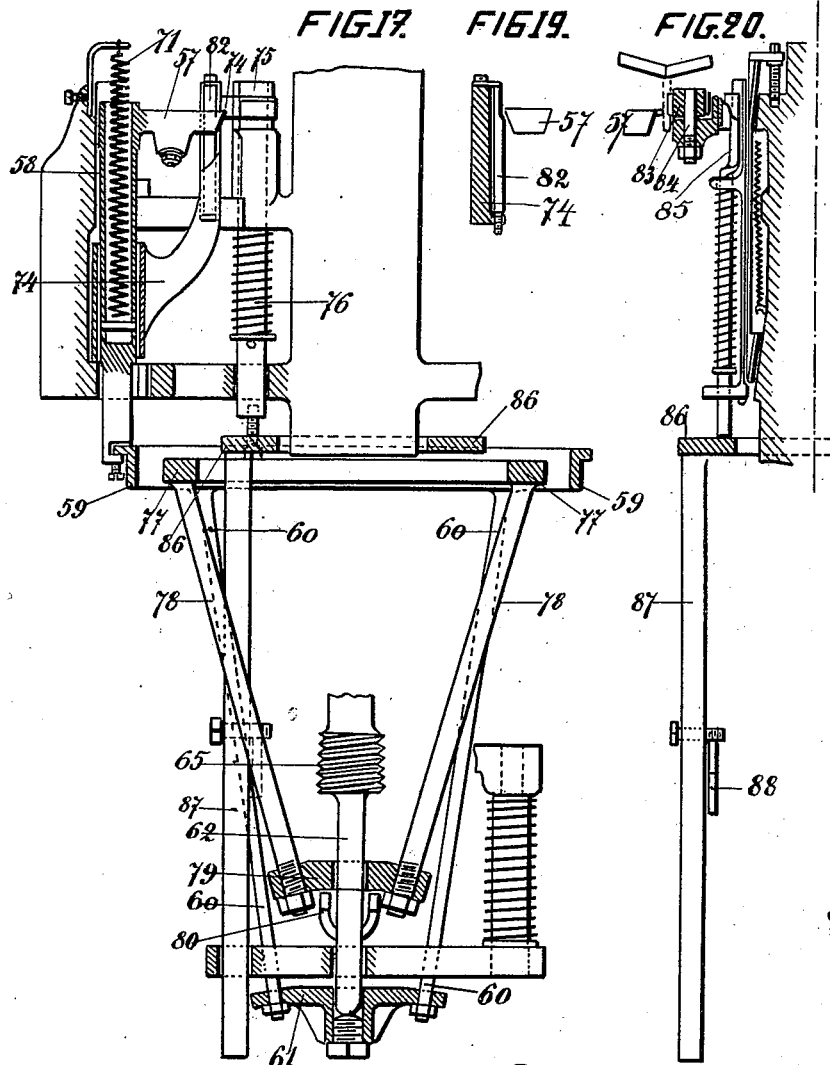

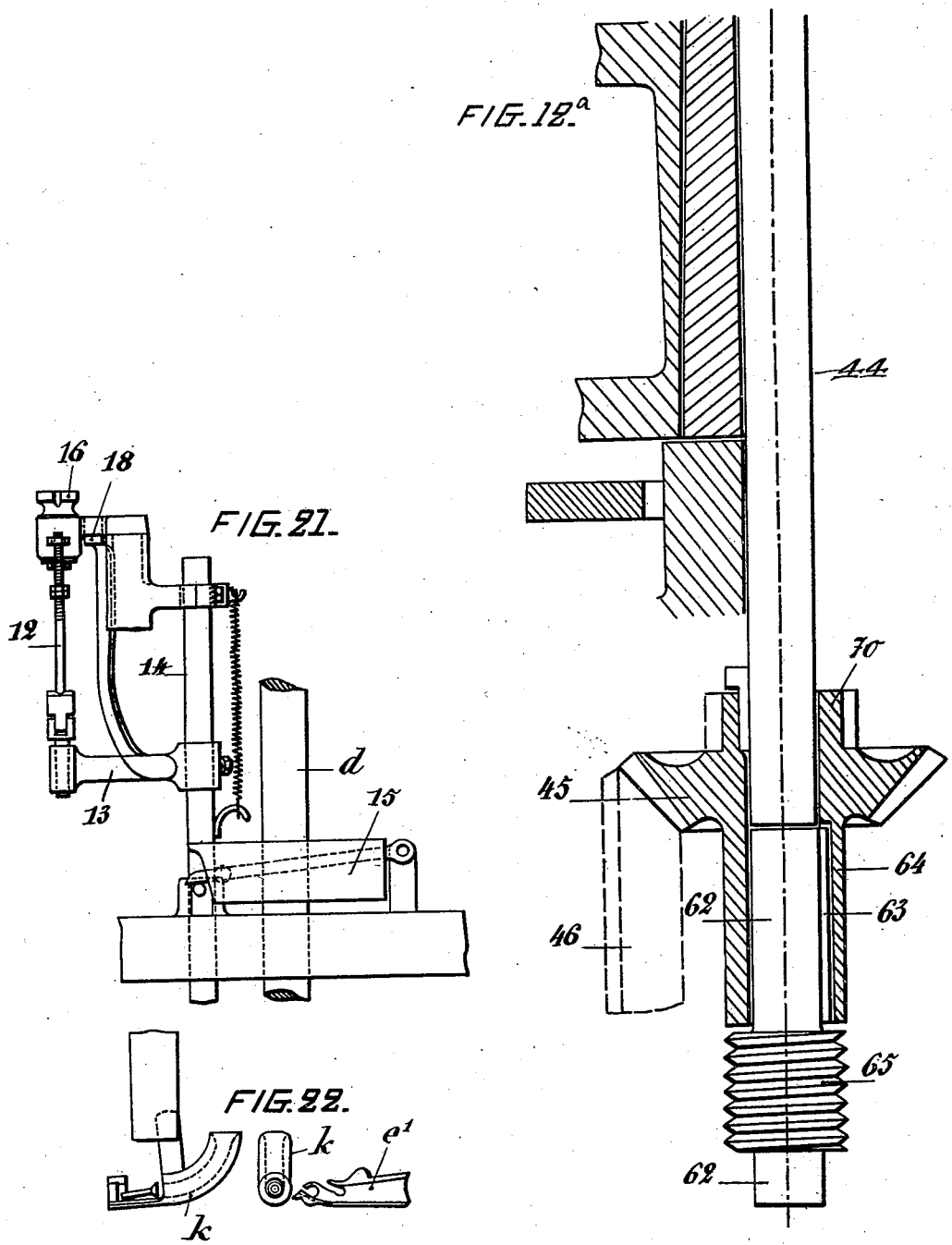

UNITED STATES PATENT OFFICE.

THOMAS JAMES SLOAN, OF PARIS, FRANCE.

MACHINE FOR MANUFACTURING WOOD-SCREWS.

SPECIFICATION forming part of Letters Patent No. 645,139, dated March 13, 1900.

Application filed April 23, 1897. Serial No. 633,510. (No model.)

*To all whom it may concern:*

Be it known that I, THOMAS JAMES SLOAN, of the city of Paris, France, have invented Improvements in Machines for the Manufacture of Screws, (for which I have obtained Letters Patent in France for fifteen years, dated August 29, 1896, No. 259,290,) of which the following is a full, clear, and exact description.

This invention relates to a machine for the manufacture of screws which receives the blanks from the stamping-machine and turns them out completely finished.

The machine preferably consists, essentially, of a series of mechanisms for performing successively the following operations: first, turning the head of the screw, forming the nick in the head, and removing the objectionable burs in the head which result from the nicking operation, and, second, pointing (in the case of wood-screws) and threading the stems.

A characteristic feature of the machine is that the screw-threading tools, which are independent in their action, act successively upon the length of the thread of each screw produced, the first tool effecting the roughing and the last tool finishing, so that should the work performed by one of the tools of the series be defective the defect will be remedied by the succeeding tools, and absolutely-perfect screws will be turned out.

The machine illustrated also comprises a distributer, which takes the blanks from the feed-channel, presents them in succession to the different tools, and removes at the same time the screw which has been operated on. This distributer-arm first presents each blank to screw-holding chucks, which present it to the tools for turning and nicking the head. These chucks or grippers are mounted at one hundred and eighty degrees apart upon a chuck-carrier on a vertical shaft, which chucks are thereby brought at the desired moment opposite the distributer-arm to deliver the screw thereto after it has been turned and nicked and to receive the blank which it presents. The chuck which has received the blank rotates while a tool turns the head, while the other chuck does not rotate, but presents the blank whose head has been turned to the milling-tool. At a given moment the shaft which carries the chucks makes a half-revolution. The first chuck takes the place of the second, so as to present to the milling-tool the blank whose head has been turned, and the second chuck returns to the position of the first and subjects the head of the blank which it holds to a second action of the head-turning tool for removing the burs produced by the nicking-tool. The blank is then again received by the distributer, which conducts it to the pointing and screw-threading tools. Every time that the chuck-carrier after having completed half a revolution presents a chuck carrying a blank to the action of the tool for turning the head or removing the burs the chuck receives rotary motion, and in order that it may be set in motion without shock it is thrown into gear through the medium of a spring-cushioned toothed wheel.

The pointing and screw-threading tools preferably comprise a certain number of chucks rotating on their axes. These chucks are arranged in a circle on a carrier, and the whole may turn about the axis of the carrier, so that each chuck will present the blank which it carries successively to the action of the pointing-tool and cutting-tools, which tools are also arranged in fixed positions in a circle. This screw-threading machine thus differs from those heretofore used in that each screw made has its entire thread traversed successively by all the tools of the series from the roughing to the finishing tools, as will be described. The distributer coming opposite to these tools takes from the chuck which is opposite to it the screw which is completely finished and delivers to this chuck the blank with the finished head, which it brings to it. This chuck presents the screw which it has just received to the action of a special tool for pointing and then as the carrier rotates presents it to the action of screw-threading tools, each tool after the first working in the cut of the preceding one. In this arrangement there are as many tools as chucks, so that each chuck is always opposite to a tool, and when an operation is terminated the chuck-carrier makes only such fraction of a turn as to allow each chuck to present its screw to the action of the following tool, the last tool performing the finishing operation.

The finished screw is carried away by the distributer-arm, which throws it into a collecting-trough.

The machine performs all the operations required in the manufacture of screws—operations which have heretofore only been performed by means of several apparatus. The invention therefore enables considerable economy to be effected, and, moreover, the production is very much greater.

I have represented in the accompanying drawings an example of the machine, with the understanding that I do not limit myself to this structure.

Figure 4:
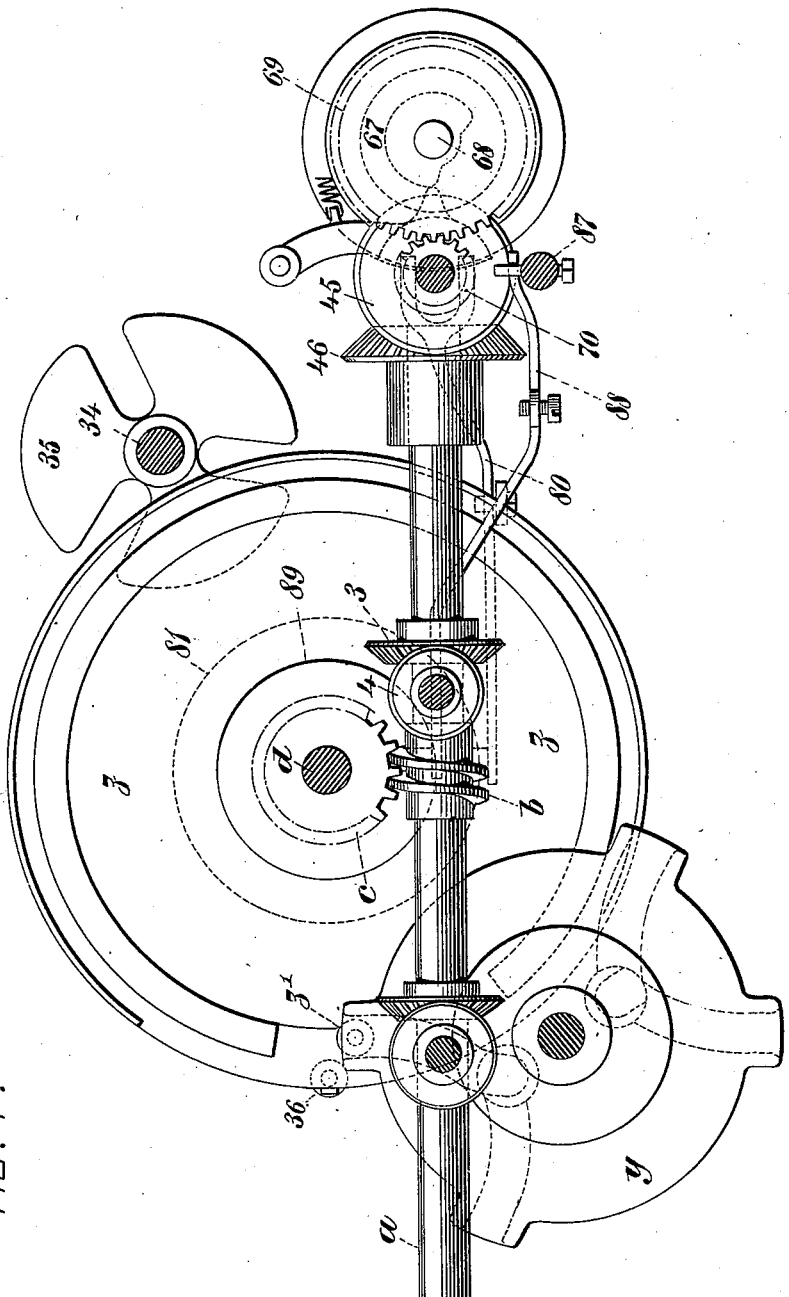

Figure 1 is an elevation of the upper half of the machine; Fig. 1$^a$, an elevation of the lower half, and Fig. 2 is a plan of the machine. Fig. 3 is a horizontal section on line 1 2 of Fig. 1, clearly showing the general plan of the operating parts. Fig. 4 is a plan of the driving-gear for imparting motion to the operating-shafts. Figs. 5, 6, and 7 are detail views showing the distributer shown in plan in Fig. 3 in elevation, end view, and plan, respectively. Fig. 8 is a vertical section of a chuck which holds the blank during the turning and nicking of the head. Fig. 9 is an underneath plan view showing the spring-cushioned driving-wheel of the chuck shown in Fig. 8. Figs. 10 and 11 show in elevation and plan the device carrying and effecting the gearing of the pinion which is thrown into gear with the spring-cushioned gripper-wheel. Figs. 12 and 12$^a$ are vertical sections of one of the chucks for holding the screw during the threading and of the carrier for imparting the movements of translation to these chucks. Figs. 13, 14, and 15 are detail views showing in elevation, end view, and plan the screw-pointing device. (See Fig. 1 for the location of this mechanism in the machine.) Fig. 16 is a plan view of the principal parts for cutting the thread. Fig. 17 is a vertical section showing the operating-gear which raises, lowers, and laterally moves the threading-tool. Fig. 18 is a detail elevation of the device which moves the tool laterally. Fig. 19 is a detail view of the part whereby the tool is enabled to produce the conical form of the screw-point. Fig. 20 shows the mechanism for operating the backstay or rest against which the screw bears during the threading. Fig. 21 shows the mechanism for operating the rest against which the blank bears during the turning of the head. Fig. 22 is an elevation and side view of the end of the feed-trough.

In the figures the same reference letters and figures denote the same parts.

The various parts are driven from the main shaft $a$, Figs. 1$^a$, 2, and 4, provided with fast and loose pulleys. The shaft $a$ drives by a worm $b$ and worm-wheel $c$ a vertical cam-shaft $d$, on which are keyed different cams for imparting the principal movements to the different parts of the machine.

The feeding of the blanks is effected by a specially-constructed distributer consisting of a rod $e$, at the extremity of which is jointed a finger $e'$, held in position by the action of a spring. This finger $e'$ is terminated by two small spring-grippers $e^2$ $e^3$, each adapted to seize a screw. The arm $e$ is mounted at the end of a shaft $f$, capable of receiving two movements—rotary motion about its axis and sliding motion in the direction of its length. These two movements are so combined that the distributer may receive either a movement of rotation about the axis of spindle $f$ or a forward or backward movement relatively to the machine, so as to perform the evolutions necessary for transporting the screws where required. The movement of rotation is obtained by means of a toothed sector $f'$, keyed on the spindle $f$, Figs. 5, 6, and 7, and in gear with a rack $g$, connected by a link with a lever $g'$, to which is jointed a rod $g^2$, whose extremity is acted on by a cam $h$, keyed on the vertical cam-shaft $d$, and whose various steps correspond to the different amplitudes of the angular motions of the distributing-arm $e$. The sliding motion of the spindle $f$ is derived from a lever-arm $i$, movable about a pivot $i'$ by the action of a cam $j$, keyed on shaft $d$, this lever $i$ being connected by a link $i^2$ with the end of spindle $f$, the connection of the link with the spindle being effected by any coupling permitting free rotary motion of the spindle. The distributing-arm being in the position shown in Fig. 6 first receives a forward movement, so as to seize by its leading gripper $e^2$ the blank which is contained in the notched part of the feed-trough $k$. (See Fig. 1 and the detail view, Fig. 22.) The distributer-arm then retires and turns through about ninety degrees from right to left in order to place itself opposite the chuck for turning the head and holding the blank during turning. As before stated, this combination of tools comprises two such chucks $l'$ $l^2$, as follows: Each chuck for this purpose comprises, as shown in Fig. 8, a tubular casing $m$, within which is mounted a system of jointed levers $n'$ $n^2$, terminating in gripping-jaws $n^3$ $n^4$. Upon the casing $m$ is a sliding collar $o$, carrying at its upper part a pair of friction-rollers $p$ and constantly pressed upward by a spring $q$, whereby the rollers $p$ are pressed against the ends of the upper members of the gripper-levers $n'$ $n^2$, whereby the gripping-jaws are closed together. The opening motion of the jaws is effected by the descent of rod $r$, carrying a cross-head $s$, guided by slots in tube $m$, and which in descending bears upon the collar $o$, and pressing between the two upper members of the chuck forces them apart. Each chuck receives rotary motion about its axis through the medium of a spring-cushioned toothed wheel $t$, whereby shock is avoided on its being thrown into gear. The chucks $l'$ $l^2$ are mounted on the chuck-carrier or cross-head $u$, in which they can turn freely, the chuck-carrier being fixed upon a vertical shaft $v$, turning in bearings in the frame. By the revolution of the shaft $v$ the chucks $l'$ $l^2$ are presented in turn opposite the distributer-arm $e$ to receive therefrom a blank, of which the head is immediately turned by the cutter $w$, (see Fig. 3,) against which it is revolved by the rotary motion of the chuck about its axis. At a given moment the shaft $v$ makes half a turn about its axis and again stops, so that the chuck $l^2$ has taken the place of the chuck $l'$ in order to receive a blank and turn the head, while the chuck $l'$ presents the head already turned to a milling-tool $x$, which cuts the nick. The shaft $v$ then again makes a half-turn and stops, whereupon the chuck $l^2$ presents its blank to the milling-tool $x$, while the chuck $l'$ brings back the notched head of the blank which it holds and again turns it in contact with the cutter $w$ to remove the burs, after which it delivers it up to the distributing-arm, receives another blank, and so on for each chuck.

The intermittent rotation of the vertical shaft $v$ is obtained by means of a slot-wheel $y$, (see Fig. 4,) keyed on that shaft, actuated by a disk $z$, keyed on the vertical shaft $d$, and carrying a pin and friction-roller $z'$, which at each revolution engages in one of the slots of the wheel $y$ and gives it half a turn. For the relative positions of these parts just described see Fig. 1ª. In order to securely lock the chucks $l'$ $l^2$ in place during the turning and nicking of the heads, the chuck-carrier $u$ has two diametrically-opposite notches $u'$, with which alternately engages the end of a lever 1, the lever being retracted when the shaft $v$ is to be turned under the operation of a cam 2 on shaft $d$. The rotary motion of the chucks $l'$ $l^2$ each about its own axis is produced as follows: Each chuck is provided with a toothed wheel $t$, which comes into gear with an intermediate wheel $t'$, actuated by a wheel $t^2$, keyed on a shaft $t^3$, receiving motion from the driving-shaft $a$ through the medium of bevel-gear 3 4. The intermediate wheel $t'$, which is mounted upon a support movable about the axis $t^3$, is brought up to the toothed wheel $t$ by the action of a spring 5 and a hook 6, forming part of a lever 7, which is pressed by the lever 1. When the shaft $v$ is to make its half-revolution, the lever 1 on being disengaged from the notch $u'$ oscillates the lever 7, and the hook 6 is retracted at the moment of throwing out of gear. On the other hand, at the moment of throwing into gear as soon as the lever 1 is engaged in its notch the lever 7 is oscillated in the opposite direction under the action of its spring, and the hook 6 engages with the stud carrying the wheel $t'$. In order to avoid all shock when after the half-revolution of the shaft $v$ the wheel $t$ is thrown into gear with wheel $t'$, the toothed wheel $t$ is mounted loose on the casing of the chuck and is supported by a collar $m'$, fast thereon, the wheel $t$, Figs. 8 and 9, transmitting rotary motion to the chuck through the medium of a spring abutting on the one hand against a lug $m^2$ on the collar $m'$ and on the other hand against a lug $t^4$ on the wheel $t$. In order to avoid all binding of the spring, the latter is made in sections connected by movable guide-blocks 8, as shown in Fig. 9. The opening and closing of the chucks are effected at the proper moments by the action of a tappet 9 on the spindle $r$, this tappet being formed by the extremity of a lever movable above the axis 10 and actuated by a cam 11, keyed on the shaft $d$.

When the screw-blank is engaged between the jaws of one or other of the chucks $l'$ $l^2$, it is acted on by a pusher 12, which brings its head opposite to the cutter $w$. This pusher 12 is mounted by a jointed connection upon a support 13, clamped at the proper height upon a vertical rod 14, whose up and down movements at the proper times are determined by the action of a cam 15, mounted on the cam-shaft $d$. The screw-blank is held up against the cutter $w$ during the turning of the head by a rest 16, movable about an axis 17, Fig. 3, and whose forward and backward motions are produced by a wedge 18, mounted upon the support 13. The contour of the cam 15 is such that when the screw-blank is engaged between the jaws of the chucks $l'$ or $l^2$ the rod 14 receives an upward motion. In this movement the wedge 18 escapes the part 16, which under the action of its spring brings the pusher 12, Fig. 3, into line with the axis of the chuck, and the pusher then comes into contact with the head of the screw and raises it to the height of the cutter. The rod 14 is then moved downward, causing the wedge 18 to bring the part 16 against the stem of the screw-blank in order to support the latter while the head is being turned.

The cutter $w$ is fixed in a holder $w'$, movable about an axis $w^2$, so as to advance the cutting-tool against the head of the screw-blank at the beginning of the operation and retract it when the operation is completed, the movement of this tool-carrier being produced by a lever 19, actuated by a cam 20, keyed on the shaft $d$. The cutting of the notch is effected at the moment when the screw-blank after having had its head turned is brought by the half-revolution of the shaft $v$ to the diametrically-opposite point, this operation being performed during the turning of the head of the next succeeding blank. The milling-tool $x$ for cutting the notch is mounted on a horizontal axis $x'$, actuated by a pinion $x^2$ and worm $x^3$ from a vertical shaft $x^4$, driven from the main shaft $a$ through bevel-gear $x^5$ $x^6$. The horizontal shaft $x'$ turns in bearings carried by a bracket $x^7$, movable about an axis $x^8$, and at the moment when the notch is to be cut the whole system is raised by turning about the axis $x^8$ and lowered again as soon as the notch is cut. For this purpose a thrust-rod 21 (see Fig. 1) abuts against an arm of the bracket $x^7$, the rod being mounted on the end of a lever 22, actuated by a cam 23, keyed on the shaft $d$, the rod 21 being capable of adjustment, so as to regulate the depth of the notch. The screw-blank after being notched is then again presented, after half a revolution of the shaft $v$, to the action of the cutter $w$, as above stated, this operation being analogous to that of turning, and has for its object to remove the burs caused by the milling-tool. The screw-blank having had its head turned and notched is then retaken by the distributing-arm $e$. The latter having come opposite the screw after its movement of rotation through about ninety degrees receives a forward movement, the finger $e'$ meeting a fixed abutment 24 (see Fig. 1) and is thereby deflected and caused to take hold of the turned and notched blank by means of its rear nipper $e^3$. The distributer then descends slightly and moves backward, so to present to the jaws of $l'$ or $l^2$ the screw-blank, which it carries in its front nipper $e^2$. After having delivered this blank the distributer is slightly retracted and rotated through about one hundred and eighty degrees and brings the blank which has had its head turned and notched up to the pointing and screw-threading tools. This combination of mechanism comprises a certain number of chucks, which hold the screws during the work and impart to them rapid rotary motion about their axes and which successively bring the screws opposite to the different cutting-tools. Each chuck is constructed, as shown in Fig. 12, of a hollow mandrel, within which is a vertically-movable rod 25, constantly pressed upward by a spiral spring and terminating in a head having a pair of slots 26, in which engage when the rod is moved downward two lugs 27, carried by the lever-arms 28 of the chuck which carries the jaws 29, adapted to retain the head of the screw-blank. In their normal position these two jaws are constantly pressed together by the action of the spring acting on rod 25; but when the latter is moved downward the slots 26, in which engage the lugs 27, produce the opening motion of the jaws. The type of machine represented in the drawings is provided with six such chucks; but it is to be understood that this number may be varied, according to circumstances. These six chucks are arranged in a circle on a chuck-carrier 30, capable of rotating freely about a central support or sleeve 31 and receiving intermittent angular motion, so as to carry each chuck from one tool to the next, the extent of this angular motion in the present case being therefore one-sixth of a revolution. For this purpose the chuck-carrier 30 is provided with a toothed wheel 32, in gear with a pinion 33 (see Fig. 2,) keyed on a vertical shaft 34, having at its lower end a slot-wheel 35, (see Fig. 4,) in the slots of which engages at each revolution of shaft $d$ a stud and friction-roller 36, on the under side of the disk $z$. After each angular motion the parts are retained in the position to which they are moved by a pawl 37, (see Fig. 2,) which is caused to engage at the exact moment with one of the teeth of the wheel 32, the pawl being retracted during the angular motion, the movement of the pawl 37 being produced by a bell-crank lever 38, acted on by a cam 39, keyed on the shaft $d$. The opening motion of each chuck is produced at the proper moment by a tappet 40, which is caused to depress the stem 25 by the action of a cam 41, keyed on the shaft $d$. Each chuck also receives rapid rotary motion about its axis, and for this purpose each mandrel is provided at its upper end with a pinion 42, all these pinions being in gear with the wheel 43, keyed on the vertical shaft 44, which passes through the central support 31, on which the chuck-carrier 30 turns, this shaft 44 being driven from the main shaft $a$ through bevel-gear 45 46. (See Fig. 1ª.) Opposite the first chuck of the series—that is to say, the one in front of which the distributer $e$ has been brought—is situated the tool for pointing the blank. This tool consists of a cutter 47, Figs. 14 and 15, held in a tool-carrier 48, provided with a small annular rest 49, in which the blank is supported during the pointing. This tool-holder receives an upward vertical motion at the moment of commencing the operation and returns to its initial position as soon as its action is completed. For this purpose it is carried by a small vertical rod 50, against the lower end of which abuts a lifting-rod 51, jointed to a lever 52, actuated by a cam 53, keyed on the shaft $d$. The tool-holder 48 also receives at a given moment a slight angular motion, so as to be retracted and make room for the distributer. To this end the rod 50 is provided with a finger 54, which in its downward movement meets an incline 55, against which it is pressed by the action of a spring. The finger in sliding along this inclined plane communicates to the rod 50 the required angular motion. Opposite to each of the other chucks is mounted a screw-cutting tool, each of these tools being identical in construction. The first tool produces a roughing cut the length of the thread to be cut, the remaining tools successively following in the cut thus made and being so regulated that each continues the work of the preceding one.

Each screw-threading tool must in the machine illustrated perform the following operations: pass several times along the part of the shank to be threaded, be retracted after each passage in order to return without touching the screw to the commencement of the thread, make a deeper cut at each passage, and cut during one and the same passage gradually deeper in order to give the required slightly-conical form and sharp point to the screw.

The tool 56, Fig. 16, which is a sort of graver, is fixed in a holder 57, mounted on a tubular spindle 58, receiving a relativelyslow downward motion during the screw-threading operation and an upward or return motion to return the tool to its initial position. All the tool-carriers 57 receive the same movement at the same time, and all of the spindles 58 are actuated in their downward movement by a ring 59, connected by rods 60 to a cross-head 61, forming a sort of footstep-bearing, in which turns the lower end of a short shaft 62. (See Figs. 12ª and 17.) This shaft is connected by a sliding key 63 with a corresponding groove in the hub 64 of the bevel-wheel 45 on the shaft 44, and it is also provided with a leading-screw 65, with which is capable of being geared at a given moment a segmental nut 66, Fig. 1, which is moved to and fro in order to be put in or out of engagement with the screw 65 by a cam 67 on the shaft 68, (see Figs. 4 and 1ª,) driven through wheel 69 and pinion 70, which is rigid with the bevel-wheel 45, Fig. 1ª. The hub 64 thus turns the shaft 62, which when the screw is engaged by the nut 66 is forced to move downward, carrying with it the ring 59, and consequently all the tool-carriers 57. As soon as the nut 66 is disengaged from the screw 65 the tool-holders are raised by spiral springs 71, contained in the tubular spindles 58, the whole being governed in its ascent by cam 72, Fig. 1ª, keyed on the shaft 68, against which bears roller 73, carried by the cross-head 61. Each tool thus receives a downward movement and passes several times—three, for example—along the part of the screw-stem to be threaded. Before commencing its downward motion each tool should be applied against the screw to be threaded, and for this purpose at the beginning of the operation each tool-holder 57 is pressed forward by a lever 74, (see Figs. 16, 17, and 18,) against the extremity of which bears an inclined plane 75, carried by a rod 76. When the rods 76 receive an upward movement, the tool-carriers 57 move toward the screws to be threaded, and, on the other hand, when the rods descend the tool-carriers are retracted. Furthermore, at each fresh cut the rods 76 rise higher, so as to force the tool to make a deeper cut. These different upward and downward movements of the rods 76 are produced as follows: The lower ends of all the rods 76 bear upon a ring 77, connected by rods 78 to a hub 79, Fig. 1ª, under which engages the forked end of a lever 80, actuated by a cam 81, keyed on shaft $d$. In order to cause the tool to make a gradually-deepening cut, so as to give the screw its conical form, the lever-arm 74 carries a cam-like piece or templet 82 of the form shown in Fig. 19, against which bears the tool-carrier 57 in its descent. The screw is supported during the action of the threading-tool by a rest 83, which is movable about a pivot 84 and bears against the screw at the commencement of each threading operation, its motion being produced by a rod 85, which is recessed at its upper part to allow the blank to be retracted.

Each rod 85 is guided by two collars and is pressed by a spring against a ring 86, receiving vertical motion. This ring is carried by a rod 87, guided at its lower part, which is actuated through a lever 88 from a cam 89 on the shaft $d$. The screw-threading tools being thus arranged, there are always six screws being operated on at a time, one being pointed and five being threaded. Each screw is acted on successively by these six tools (of which the first three are rough-threading tools and the rest finishing) and when the screw is finished it is retaken from the jaws of the chuck, by which it has been held during all these operations, by the distributer $e$. The distributer, after having placed between the jaws of the chuck the screw to be threaded, which it brings to it in its rear nipper $e^3$, is slightly retracted and turns in the reverse direction through about forty-five degrees, so as to cause the completely-finished screw to be taken by its front nipper $e^2$, which transfers it to a collecting-channel 90 by a slight retracting motion of the distributer, which disengages the screw from the nipper $e^2$ and allows it to fall into the channel 90. The distributer continues then to turn in the same direction and comes opposite to the feed-channel $k$. It again moves forward, takes therefrom another screw-blank, and the same operations are repeated, and so on.

The general operation of the machine may be summed up as follows: The distributer takes with its forward nipper $e^2$ a screw-blank. Then after making a slight backward movement it turns through about ninety degrees in order to come opposite the tools for turning and nicking the head. It then moves forward in order to seize with its rear nipper $e^3$ the screw-blank of which the head has been turned and nicked and then descends slightly and gives up to the chuck $l'$ or $l^2$ the screw which it brought in the nipper $e^2$. The distributer after a slight backward movement then turns through about one hundred and eighty degrees in the opposite direction, so as to come opposite to the threading-tools. It then seizes by a forward movement with its front nipper $e^2$ the finished screw held in the jaws 29, which are opposite to it. Then after having slightly advanced so as to engage between the same jaws the screw-blank to be threaded which it holds in its rear nipper $e^3$. The distributer is then slightly retracted and turns backward through about forty-five degrees and engages the finished screw in the collecting-channel 90, and then by a further slight backward movement the nipper $e^2$ abandons the finished screw, which falls into the channel 90, the distributer $e$ then completing its cycle, so as to again come opposite to the feed-channel $k$, to which it again advances in order to take therefrom a fresh screw-blank, and so on. During the movements of this distributer there are always eight screws in work, one having its head turned, a second being nicked, a third being pointed, and five others being threaded. To each cycle of the distributer correspond a half-revolution of the carrier for the chucks l' l² and an angular motion of one-sixth of a turn of the chuck-carrier 30.

I claim—

1. In a screw-making machine, the combination of a cross-head, a pair of chucks carried upon the said cross-head, a head-forming tool and a head-nicking tool in operative relation to the said chucks so as to form and nick the head of a screw, a procession of chucks for carrying screw-blanks, a series of tools with means for causing the same to operate upon the screw-blanks carried by the chucks and a screw-transporting mechanism comprising in its structure means for performing the following operations, to wit: seizing a screw-blank from a source of supply, transporting the same to the head-forming mechanism, removing the blank with the finished head and inserting the rough blank into the head-forming mechanism, thereupon executing a swing to bring the transporting mechanism into coöperative relation with the chucks for holding the screw-blanks to be threaded, seizing the finished screw from the chuck and inserting the screw-blank head first into the said chuck and thereupon transporting the finished screw to and dropping the same into a receptacle provided for the purpose.

2. In a screw-making machine, the combination of head-forming apparatus, of chucks, with means for moving the same in procession past thread-cutting tools and returning the said chucks to an initial normal position, of a transporting mechanism for transporting the screw-blanks, comprising in its structure a double nipper with means for imparting to the said double nipper the following movements, to wit: a rectilinear movement to seize a rough screw-blank from a receptacle, a swinging movement to bring the double nipper opposite the head-forming apparatus, a rectilinear movement to cause the double nipper to seize a screw-blank from the head-forming apparatus, a movement of retraction and another movement to effect the insertion of a rough screw-blank into the head-forming apparatus, a swinging movement to bring the double nipper opposite the chuck containing the finished screw, a movement toward the said chuck to seize the finished screw therefrom, and another movement toward the said chuck to deliver the headed screw-blank thereto and a swinging movement away from the said chuck to a receptacle provided for the finished screw.

3. In a machine of the character described, the combination of a plurality of traveling chucks presenting a screw-blank successively to a series of screw-thread-cutting tools, a series of thread-cutting tools located along the path of movement of the chucks, successive tools operating in the cut of the preceding tool, a common means for simultaneously traversing all of the said thread-cutting tools along the length of the screw-blank and independent tool-advancing means for advancing the individual tools into the work and a common operating means for operating the tool-advancing means.

4. In a machine for making screws, the combination of a series of blank-carrying chucks with means for effecting rotary motion of the said chucks and for effecting a movement of translation of the said chucks, a series of screw-thread-cutting tools to which the chucks bring up the blanks successively, each successive tool operating in the cut of its predecessor, a common means for producing a movement of translation of the said cutting-tools along the stem of the screw-blank and a series of templets one for each tool, for determining the profile of the cut.

5. In a machine of the character described, the combination of head turning and nicking tools, of a series of chucks for holding the blanks during the head-turning and nick-cutting operations, a series of traveling chucks presenting blanks in succession to a series of thread-cutting and screw-pointing tools, means for bringing the chucks in succession to the thread-cutting and screw-pointing tools and a carrier or transporting apparatus for transporting the screw-blanks one by one from the chuck coöperating with the head-turning tool to a chuck coöperating with the blank-pointing tool, substantially as described and for the purposes set forth.

6. In a screw-cutting machine, the combination of a series of traveling chucks carrying blanks in procession in front of a series of tools, a series of independent thread-cutting tools mounted in the path of movement of the blanks, the successive tools working in the same cut or thread, a common means for traversing the said tools along the length or stem of the blank and means local to each tool for causing the said tools to make progressively-deepening cuts, substantially as described and for the purposes set forth.

7. In a screw-making machine, the combination of head-forming mechanism and thread-cutting mechanism, comprising means for carrying the blanks in procession before a plurality of thread-cutting tools and for causing the said thread-cutting tools to operate one after the other to produce the thread, of a transporting mechanism for transporting the screw-blanks from the head-forming mechanism to the thread-cutting mechanism, substantially as described and for the purposes set forth.

8. In a machine for making screws, the combination of head-forming mechanism and a plurality of chucks with means for moving the same in a procession and bringing them back to a given point and a transporting mechanism for transporting the headed blanks from the head-forming mechanism to the chuck standing in the initial position and containing the finished screw.

The foregoing specification of my improvements in machines for the manufacture of wood-screws signed by me this 5th day of April, 1897.

THOMAS JAMES SLOAN.

Witnesses:
EDWARD P. MACLEAN,
MAURICE HENRI PIGNET.